United States Patent [19]
Thomas, Jr. et al.

[11] 3,779,071
[45] Dec. 18, 1973

[54] FATIGUE STRAIN GAUGES

[75] Inventors: Alvin D. Thomas, Jr., Austin, Tex.; Joseph Scott Thornton, Chagrin Falls, Ohio

[73] Assignee: Tracor, Inc., Austin, Tex.

[22] Filed: Sept. 13, 1971

[21] Appl. No.: 180,007

[52] U.S. Cl. .................................. 73/88.5 R, 338/2
[51] Int. Cl. ............................................. G01l 1/22
[58] Field of Search .................... 73/88.5 R; 338/2, 338/114

[56] References Cited
UNITED STATES PATENTS

| | | | |
|---|---|---|---|
| 3,080,748 | 3/1963 | Burkley | 73/88.5 R |
| 2,986,928 | 6/1961 | White | 73/88.5 R |
| 3,596,269 | 7/1971 | Laska | 338/2 X |
| 3,329,799 | 7/1967 | Carmody | 338/2 X |
| 3,286,513 | 11/1966 | Wasintynski | 338/2 UX |
| 3,603,142 | 9/1971 | Saylak | 73/88.5 R |
| 3,350,926 | 11/1967 | Webb | 338/2 X |
| 3,395,564 | 8/1968 | Rastrelli et al. | 338/2 X |
| 3,289,135 | 11/1966 | Anderson et al. | 73/88.5 R X |

*Primary Examiner*—Jerry W. Myracle
*Attorney*—Tom Arnold et al.

[57] ABSTRACT

Safety gauges for indicating the internal state of structural materials and methods for determining fatigue of such materials, are provided. In one embodiment, an integral gauge is provided for use in a composite matrix-reinforcing fiber material, the gauge being constructed of like matrix-reinforcing fiber material having therein at least one conducting filament. In another embodiment, a gauge of this type is constructed having a bundle of conducting fibers, and the gauge is bonded to the exterior of a structural part. Conducting fibers are separated from one another by matrix material, to the maximum practical extent.

6 Claims, 16 Drawing Figures

Joseph Scott Thornton
Alvin D. Thomas
INVENTORS

Fig. 5
SAMPLE #1

Fig. 6
SAMPLE #2

Fig. 7
SAMPLE #3

Joseph Scott Thornton
Alvin D. Thomas
INVENTORS

FATIGUE STRAIN GAUGES

BACKGROUND OF THE INVENTION

The lifetime of a structural part utilized in any context of use wherein the part is subjected to stresses and environmental conditions, for example structural parts utilized in aerospace applications, will be governed to at least a major extent by the stresses and strains to which the part is subjected, and the environmental conditions to which the part is exposed.

High stresses, deleterious environmental conditions, or a combination thereof, will adversely affect a structural part so that, eventually, failure of the part will result.

There exists quite a bit of information about failure of structural parts. For example, there is a great deal of empirical information relating to the effect of stress and environmental conditions on structural parts made from various materials of construction including various metals, nonmetals, and composite materials. Also, it is known that in most instances fracture of a part will be initiated at the surface of the material.

Further, it is generally known that both maximum stresses and strains and environmental factors play a major role in contributing to failure, and that these factors interact in a way that is not completely understood.

For convenience of expression, "fatigue" is referred to as a condition resulting from exposure of a material to stresses below the tensile strength of the material, which may result in fracture of the material. Static fatigue failure may result from prolonged exposure to high stress, while dynamic fatigue failure may result from cyclic stressing of a material. A failure process occurring under a combined steady stress and corrosive environment is known as "stress corrosion cracking." "Corrosion-fatigue" has some of the characteristics of each of the above failure processes, wherein the ordinary fatigue crack initiation and propagation rate is enhanced by a hostile or corrosive environment.

The combined effects of mechanical stress and various delterious environmental factors including high temperature, especially in some materials of construction, is more detrimental than any number of separate stress applications or environmental exposures.

But the exact stresses to which a structural part will be subjected, and the exact environmental conditions which will be encountered, are very seldom known with certainty. Thus, the empirical data which is available and the generalized concepts which are known as mentioned above, are not generally sufficient to indicate the probable remaining lifetime of a structural part. And at present, there is to applicant's knowledge no satisfactory procedure for determining the probable remaining lifetime of such parts. Indeed, the only procedures which are available which usually include examination in minute detail of the surface of the structural part for impeding failure, are seemingly most imprecise and likely inaccurate, and to the extent that the condition of a structural part may be determined it is an indication of such condition at the time of test or inspection only and is of limited value in determining fatigue history or remaining lifetime of the material. This is especially true if different environmental and stress effects are to be encountered than have been encountered up to the time of test or inspection.

Consequently, designers are now forced to employ unduly conservative safety factors in the design of such structural parts, thereby resulting in greatly increased costs, uncertainty, and the inability to take advantage of the full available strength of the materials employed.

While the problems as mentioned above are applicable to various materials of construction including various metals and non-metals, a special problem exists in connection with certain composite materials.

Such composite materials which include a plurality of reinforcing fibers, filaments, or sheets disposed in an elastic or plastic matrix material are becoming increasingly important in many contexts of use, particularly for structural components in many industries. Among the most important such materials in use at the present time are thermoset resin-glass fiber composites. These materials may for example be laminates, filament-wound structures, three dimensional woven structures, or in some applications it is common practice to distribute the glass fiber in a more or less random fashion in the resin matrix so that there is formed an integrated structure, rather than one in which there is stratification of the layers of material.

These resin-glass fiber composites are very strong and have great strength-to-weight ratios. Consequently, they find great utility for many structural components, for example in the aerospace industry and in boat hulls.

However, these composites are not immune from various types of physical deterioration as outlined above due both to exposure to adverse environmental conditions and to mechanical stress. Moisture and other corrosive agents in the atmosphere cause loss in strength. Stresses below the composite fracture limit, but above a certain critical level, cause crazing in the plastic matrix and fracturing of some of the reinforcing fibers. Cyclic stressing of these composites causes the growth of cracks which form at the interface between the reinforcing material and the maxrix material, and this results in dynamic fatigue failure.

Because of the importance of these composite materials especially in applications wherein failure might be encountered and such applications wherein stress and environmental effects are great and largely unknown, special attention has been directed to the problem outlined above as it exists with respect to these materials.

It would be desirable if some means could be provided for indicating the internal state of structural parts, especially parts made of such composite material. It would be desirable if there were some means available for determining the overload and fatigue history of such parts.

It would further be desirable if means of such nature could be provided so that, when properly correlated with application experience, an indication could be received as to the probable remaining lifetime of such composite structure or other structural part.

The art is especially lacking in means of such nature which might be incorporated into the interior of such a composite structure at the time the structure is being fabricated, and it would be desirable if an integral structure of this type could be provided.

It would further be desirable if means of such nature could be provided which could be incorporated into a structural member for measuring the fatigue or past overload, and for measuring the strain of the composite structural member in an inexpensive, convenient and reliable manner.

It would also be desirable to provide means which could be affixed to the external surface of a structural part, which would be effective to provide a convenient and reliable indication of irreversible changes and fatigue history.

Further, it would be desirable if means of the above types could be provided which could be readily incorporated into or affixed to structural parts at points on said parts of highest stress concentration.

The present invention provides means for accomplishing the above-stated objectives. In article form, such means comprise safety gauges which may, in one embodiment, be readily incorporated into, and in another embodiment affixed to structures of the type described, in the manner indicated, and which may be utilized to indicate the internal state and fatigue history of such structures.

SUMMARY OF THE INVENTION

The present invention relates to safety gauges and methods which may be utilized for indicating the internal state of structural materials of the nature described above. In one embodiment, the invention relates to such a gauge which may be incorporated into like composite materials, and in another embodiment it relates to such a gauge which may be affixed to structural parts. Further, the invention relates to gauges which include a conducting fiber, or bundle of fibers, and which are especially sensitive to composite strains. The invention also relates to methods for determining fatigue history of such materials.

In a preferred embodiment, the invention relates to a safety gauge made from a bundle of conducting graphite filaments or fibers which are introduced into a resin or resin-glass fiber composite material during its formation, the carbon fibers being separated from each other and from the glass fibers by resin matrix.

BRIEF DESCRIPTION OF THE DRAWINGS

In order that the invention may be more clearly understood, reference will be made to certain preferred embodiments of the invention which are illustrated in the accompanying drawings which form a part of this specification and wherein.

DETAILED DESCRIPTION OF PREFERRED EMBODIMENTS

The invention will be explained in more detail with reference to certain preferred embodiments which constitute the best mode of the invention known to applicants at the time of this application.

THE EMBODIMENTS OF FIGS. 1–4

Figure 1:
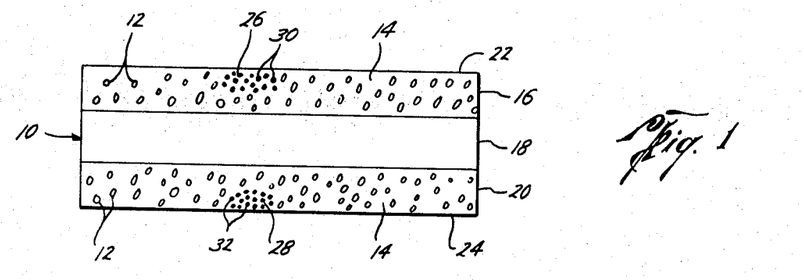
FIG. 1 is an elevational sectional view of composite material and containing as an integral part thereof a safety gauge formed in accordance with one embodiment of this invention.

Referring now in more detail to FIG. 1 there is illustrated a resin-glass fiber composite material 10 of the type described above having disposed therein as an integral part thereof, a safety gauge constructed in accordance with the present invention.

The invention in this embodiment contemplates the disposition in a resin matrix, of reinforcing fibers of great strength but relatively low modulus of elasticity, and further of fibers of high modulus of elasticity. The latter such fibers are conveniently the conducting fibers of the safety gauge of the invention in this embodiment.

FIG. 1 illustrates a three-ply laminate 10 of unidirectional glass fibers 12 incorporated into an epoxy resin matrix 14. The three plies 16, 18 and 20 of the laminate 10 are oriented in the 0° (reference), 90°, and 0° directions, respectively. The surface 22 of ply 16 and the surface 24 of ply 20 form the outer surfaces of the laminate.

At the upper and lower surfaces 22 and 24 of the laminate 10 are the bundles 26 and 28, respectively, of conducting fibers, in this embodiment graphite fibers, which are disposed in the epoxy matrix material. Bundle 26 is comprised of a plurality of individual filaments 30, and bundle 28 is comprised of a plurality of individual filaments 32. These individual filaments are oriented in the same direction as the reinforcing glass fibers in the surrounding ply, and separated by matrix material from the other conducting and reinforcing filaments to the maximum extent practical.

Figure 2:
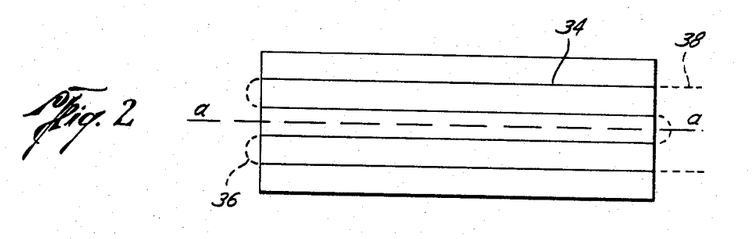
FIG. 2 is a plan section view of a structural member formed in accordance with an embodiment of the invention.
Figure 2A:
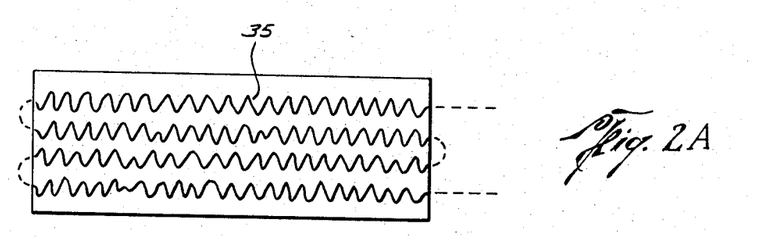
FIG. 2a is a view similar to FIG. 2 but illustrating a different fiber pattern.

FIG. 2 shows a plan section of a composite article desirably formed from the bonding together of a plurality of lamina 10 such as shown in FIG. 1, but covering a larger area as measured in the plane of the lamina. The conducting fibers 34 are disposed in the surface of the laminate in a repetitive fashion so as to effectively cover the larger area. For maximum sensitivity, the conducting fibers are conveniently connected in series electrically in the manner illustrated by the dotted lines 36 in FIG. 2. Leads may be attached from the ends of the conducting fibers as indicated by the dotted lines 38, to an ohmmeter (not shown) to measure the electrical resistance across the safety gauge.

It is not necessary or in some cases even desirable to have the conductive fibers aligned in a linear or parallel fashion as shown in FIG. 2. For example, the zig-zag pattern of fibers 35 in FIG. 2A may be effective for detection of off-axis stressing.

Figures 3, 4:
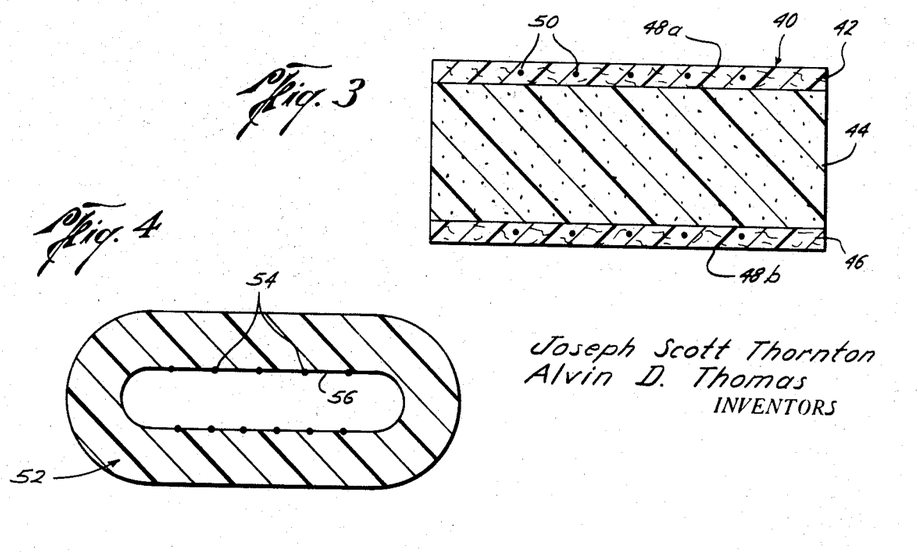
FIG. 3 is a sectional view of composite material formed in accordance with another embodiment of this invention.
FIG. 4 is a sectional view of a structure formed in accordance with another embodiment of the invention.

Measurement of electrical resistance across the gauges illustrated in FIGS. 1-3 enables one to detect both reversible and irreversible changes in the gauge caused by stressing of the composite material. Reversible changes in resistance occur when the composite is stressed to low levels and the resistance change is directly related to the average amount of elastic strain of the composite. At higher stress levels, and especially in combination with exposure to adverse environmental conditions, crazing of the matrix can occur which will cause irreversible changes in the gauge fibers. It is much more important in many and probably most contexts of use of composite materials of the type described to ascertain irreversible changes than it is to determine reversible changes. But prior to this invention there was no satisfactory way to make such determination.

Irreversible degradation and fracture of the conducting carbon fibers increases as a function of the loading on the composite material, and such increase may be readily detected by resistance measurements of the gauges illustrated in FIGS. 1-3. Reversible changes in the gauge are readily distinguished from irreversible changes because of the difference in magnitude of these changes, the reversible changes usually being indicated by a resistance change of less than 1 percent, while the irreversible changes are generally indicated by a resistance change of several times, or several hundred percent. Such resistance changes are a direct function of the amount of damage to the conducting fibers of the gauges illustrated in FIGS. 1-3, and therefore enable the observer to predict with accuracy the strength and remaining lifetime of such fibers.

Since similar changes will occur in the surrounding glass fibers of the composite material as occur in the conducting carbon fibers, knowledge of the state of the conducting fibers as outlined above can be correlated to the state of the resin-glass fiber composite material. Therefore, the strength and remaining lifetime of the composite may be readily predicted in the same manner.

For best results, it is believed by applicants at the time of this application that alignment and placement of the gauge fibers is important. As shown in FIGS. 1 and 2, alignment in the 0° direction (along the axis $a$—$a$ of FIG. 2) when the direction of maximum stress is in the 0° direction provides for maximum sensitivity of the resistance measurements.

Placement of the conductive fibers at the surface of the laminate as shown in FIG. 1 is preferred in those contexts of use wherein the stresses and strains are greatest at the surface of the material. Typically, stresses and strains due to flexural loading are greatest at the surface for this type of structural member.

In some applications, however, the greatest stresses and strains will be found at points in the material other than at the surface. In FIG. 3, for example, is shown a structural sandwich panel 40 having outer plies 42, 46 of resin-glass composite material, and a core 44 of rigid foam material. The stresses in the outer walls 48$a$ and 48$b$ of this material are more uniform, and the gauge fibers 50 may conveniently be placed somewhere near the center of the composite layers 42 and 46. Other examples of structures where best results are obtained by use of gauge fibers in the interior of the composite sheets might be cited, for example thin-walled pressure vessels.

In yet other applications, for example in a rotating disc, or in an internally pressurized thick walled vessel 52 a longitudinal section of which is shown in FIG. 4, best results are obtained when the gauge fibers 54 are placed at or near the inside surface 56 of the material. This is because maximum stresses in this type of structure occur at this surface 56.

As previously indicated, the nature of the gauge formed in accordance with the FIGS. 1-4 embodiments of the invention will be dictated by the nature of the composite structure to be observed. At the present time, many such structures are made of epoxy-glass fiber wherein the glass fibers are those commonly referred to as "E" glass or "S" glass fibers. But as indicated, other suitable matrix materials and reinforcing fibers may be conveniently employed. Other exemplary components are described below following description of other embodiments of the invention.

The invention contemplates the use of both woven and non-woven fibers. It further contemplates the use of distinct layers, such as shown in FIG. 1 and also materials wherein the fibers are disposed in more or less random fashion to achieve a completely integrated, nonstratified material.

The composite material with safety gauge incorporated therein as shown in the FIGS. 1-4 embodiments can be utilized in any desirable structural component as an integral part thereof, and the state of the composite structure can then be monitored by use of electrical resistance measurements as indicated above.

Composite materials formed in accordance with the FIGS. 1 and 2 embodiment have been found to have superior strength qualities while also exhibiting a relatively high modulus of elasticity. Such materials with integral safety gauges constructed in accordance with such embodiments have been constructed and tested, as indicated by the following examples.

EXAMPLE I

A composite structure having a safety gauge integral therein was constructed in the following manner:

Using Scotchply Type 1002 reinforced plastic as the matrix material, a first ply of like glass fibers 4 inches by 6 inches was placed in a mold, the ply being oriented 0° in the 6 inch direction. A second ply of like glass fibers was then laid up in the 90° direction, a third ply at 0°, a fourth ply at 90°, and a fifth ply at 0°. Strands of Thornel 40 graphite yarn were then placed along the top and bottom surfaces of the material, in the 0° direction, the strands being spaced about one-half inch apart. The material was then heated to about 325°-335°F for 15 minutes while the laminate was under about 100 psi pressure. The laminate was then allowed to post cure at 250°F for four hours.

On visual examination, the laminate resembled that shown in FIG. 1 except for the number of plies. The longitudinal edges of the material were then trimmed, and the material cut into small specimens for convenience of flexural fatigue testing. Each of the specimens included one or two strands of graphite yarn.

Figure 5:
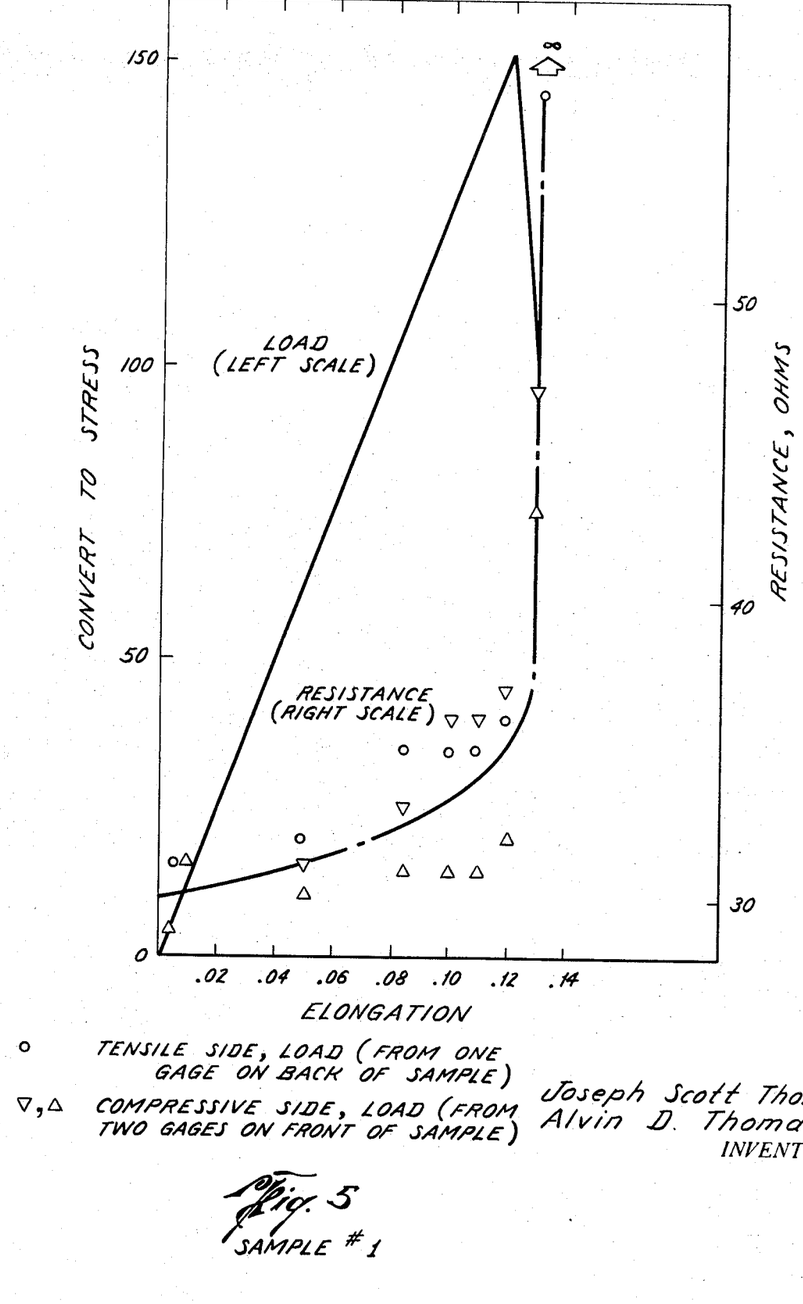
FIG. 5 is a chart illustrating test results on sample No. 1 of Example I.

Leads were attached to the ends of the graphite strands and the leads were then attached to an ohmmeter to measure the resistance across the gauge. Samples which will be designated No. 1, No. 2 and No. 3 gave the following results:

Sample No. 1 was loaded in flexure and the change of resistance was related to the maximum stress applied to the sample. The result of the correlation is shown in FIG. 5

Figure 6:
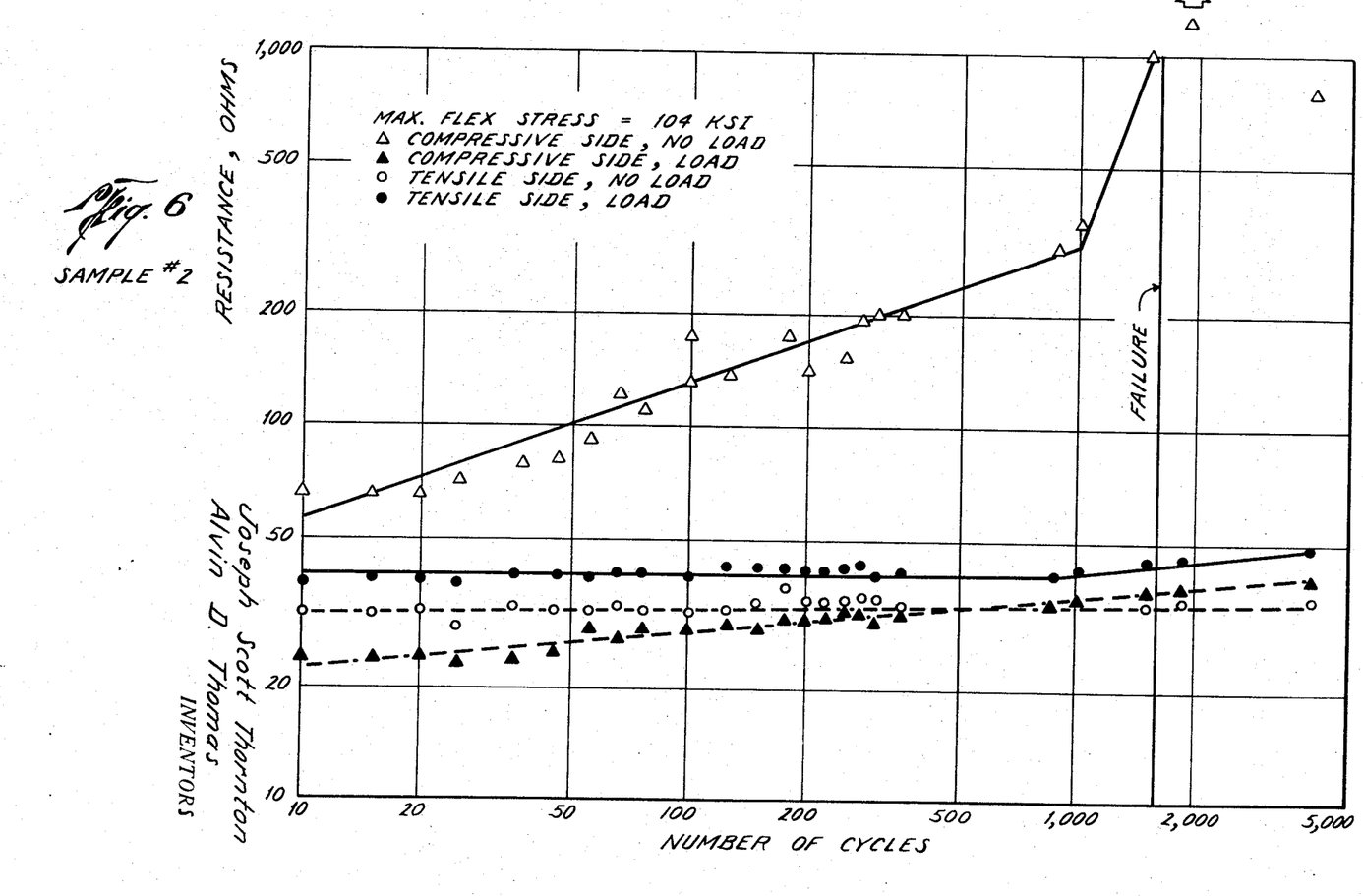
FIG. 6 is a chart illustrating test results on sample No. 2 of Example I.

Sample No. 2 was loaded in flexure in a cycling mode. This type of test is known as high stress-low cycle fatigue. The change of resistance of the gauge fibers is shown in FIG. 6 as a function of the number of flexural cycles. Both the tensile and compression side of the sample were instrumented and the resistance changes were noted for both load applied and load removed conditions. Under fatigue cycling, the resistance of the compression side is seen from FIG. 6 to have risen gradually, then abruptly as the sample neared failure. The maximum stress in this sample was 104,000 psi.

Figure 7:
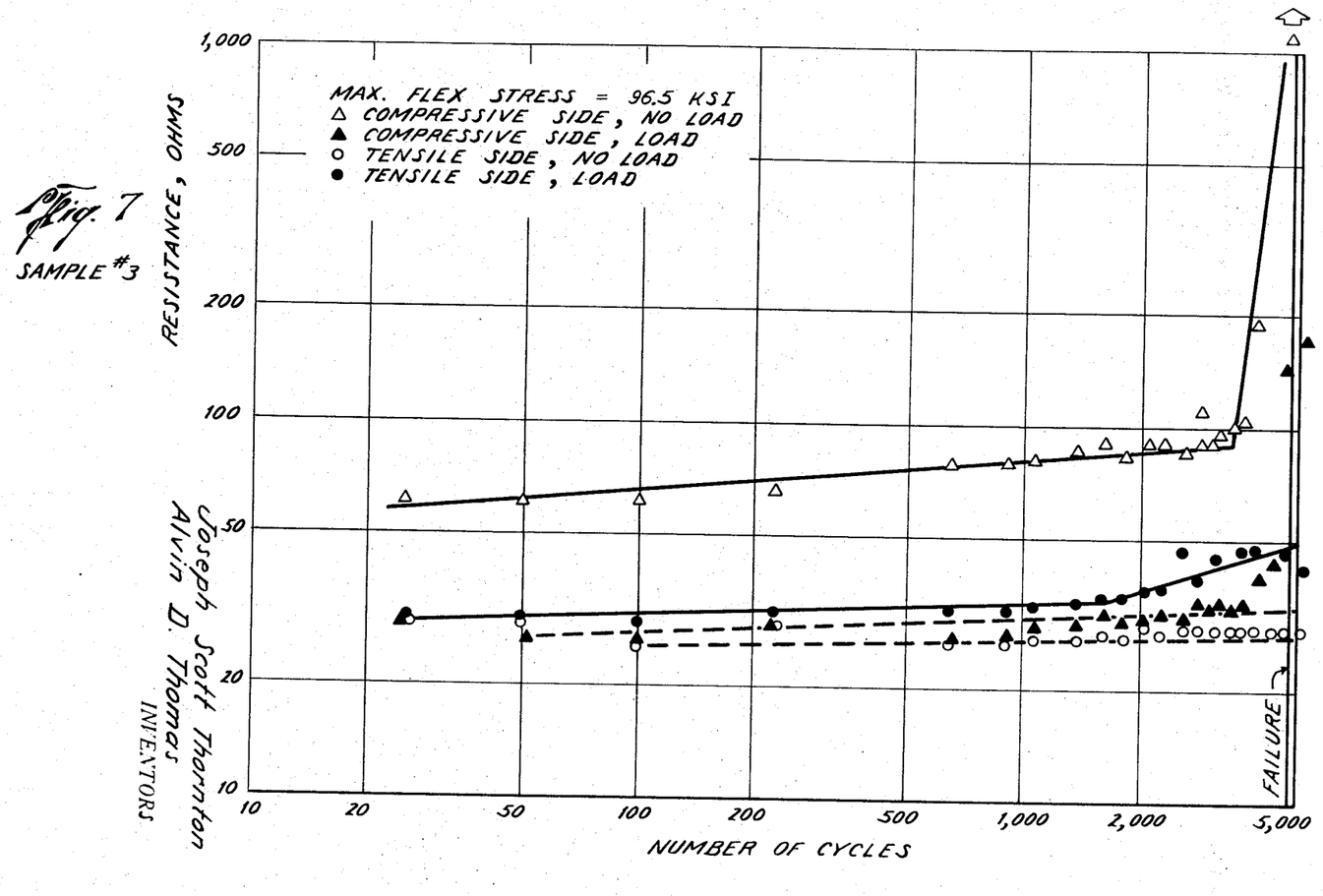
FIG. 7 is a chart illustrating test results on sample No. 3 of Example I.

Sample No. 3 was loaded in a manner similar to Sample No. 2, but the stress was somewhat lower and the number of cycles to failure was much higher. Here again, as shown in FIG. 7 the gauge indicated impending fatigue failure and demonstrated its utility for that purpose.

THE EMBODIMENTS OF FIGS. 8–13

In FIGS. 8–13 are illustrated embodiments of the invention wherein the safety gauge, rather than being integral with a structural part the stresses of which are to be measured, is affixed thereto as by bonding to the surface thereof. As in the embodiments of FIGS. 1–4, the safety gauge of the FIGS. 9–13 embodiments is desirably constructed of a composite matrix-reinforcing fiber material, and like the structure of the FIGS. 1–4 embodiments desirably incorporates a plurality of individual filaments of conducting material such as a graphite fiber, separated from one another by matrix material.

Figures 8, 9, 10, 11, 12, 13:
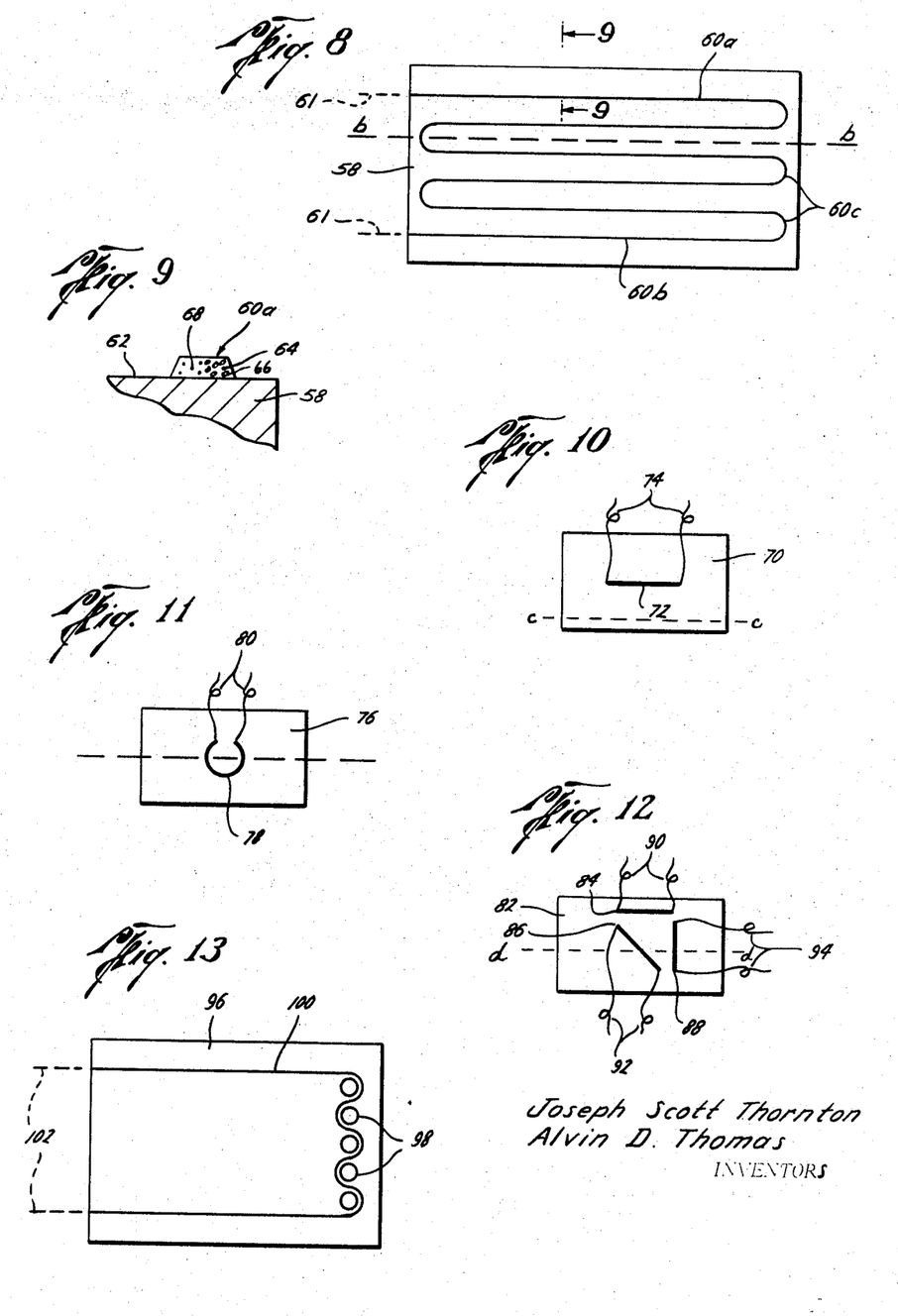
FIG. 8 is a plan view of a structural part having affixed thereto a safety gauge formed in accordance with another embodiment of this invention.
FIG. 9 is a view along the lines 9—9 of FIG. 8.
FIG. 10 is a plan view illustrating a safety gauge affixed to a structural part in accordance with another embodiment of the invention.
FIG. 11 is a view similar to FIG. 10 of a gauge in accordance with another embodiment of the invention.
FIG. 12 is a view similar to FIG. 11 of a gauge in accordance with another embodiment of the invention.
FIG. 13 is a view similar to FIG. 8 wherein the safety gauge is preferentially located adjacent the area of greatest stress concentration.

As is evident from FIG. 9, however, the gauges of the FIGS. 8–13 embodiments are bonded to the surface of the structural part under test, desirably by use of the matrix material itself as an adhesive agent, and need not include reinforcing fibers.

In FIG. 8 is illustrated a rather large structural part 58 such as an aircraft wing. The part 58 may be constructed of resin-glass fiber composite material or the like, or other suitable material of construction such as metal (e.g., aluminum) or a metal alloy. The part 58 includes a safety gauge 60 in accordance with this invention but, unlike the composite structure of the FIG. 2 embodiment, such safety gauge 60 is not integral in the composite material but rather is affixed to the surface thereof. This is clearly seen from the sectional view in FIG. 9, wherein the gauge 60 is seen to be bonded to the upper surface 62 of the structural part 58.

As in the preceding embodiments, the gauge 60 is constructed in this embodiment of a suitable matrix material 64 in which are disposed longitudinally extending reinforcing fibers 66 extending generally in the 0° direction. The bundle 68 of conducting fibers forming the gauge 60 comprises a plurality of individual conducting filaments each of which extends generally in the same direction as the reinforcing fibers 66, and here again the individual conducting filaments are separated to the maximum extent practical by the matrix material 64.

The gauge 60 may be bonded to the surface 58 by any suitable material just so long as the thickness of the adhesive layer is carefully controlled and very small.

In FIG. 8 the gauge 60 is constructed so that it will have six longitudinally extending (along the axis b—b) legs, the two outermost such legs 60a and 60b of which may be connected to an external circuit (not shown) by electrical leads 61, for making appropriate resistance measurements. The inner legs of the gauge 60 are connected by C-shaped connecting portions 60c, which are non-parallel to the axis b—b, so that the gauge is continuous from one end to the other.

Construction of the gauge 60 in accordance with the invention permits use of the gauge 60 in very long lengths such as illustrated in FIG. 8, since the irreversible changes indicated by the gauge are very large and thus the gauge output is not seriously affected by its length. In many contexts of use, such as aircraft wing structures and the like, this feature of the present invention is a very important one, as it allows for detection by a single gauge and a single measurement, of maximum stress over a very large surface area.

If the direction of maximum stress or strain is precisely known, then best results may be readily obtained just by installing the safety gauge in the appropriate direction. For example, in a small structural element 70 shown in FIG. 10 wherein major stress and strain is known to occur over a small area and to be directed along the axis c—c, the relatively short gauge 72 disposed parallel to that axis will generally be satisfactory. Electrical leads 74 are attached to the ends of the gauge 72 so that resistance measurements may be made.

FIG. 11 illustrates a structural part 76 similar to the structure 70 shown in FIG. 10, but wherein the direction of maximum stress or strain is not known, and determination of that direction is not particularly important. In such cases, an arcuate gauge 78 having leads 80 attached thereto is desirable. This gauge will measure the maximum stress from any direction although it will not reveal from which direction the maximum stress is being received.

In FIG. 12 is shown another structural part 82 similar to the parts 70 and 76 of FIGS. 10 and 11, respectively, but in this instance it is not only unknown at which direction maximum stress will be encountered, but it is desirable to know that direction. That is, it is desirable to determine both the amount of stress and the direction of that stress. In this circumstance, the gauges employed in the FIG. 12 embodiment are especially suitable. Here, a first gauge 84 with leads 90 is aligned parallel to the axis d—d. A second gauge 86 with leads 92 is aligned at a 45° angle with respect to the axis d—d, and a third gauge 88 with leads 92 is aligned perpendicular to the axis d—d. Thus, through appropriate resistance measurements, not only the amount of stress but at least the approximate direction of major stress can be determined.

In many embodiments, particular elements or portions of a structural part may be particularly prone to failure. As one example, fatigue and stress corrosion cracking may preferentially occur around fastening devices, a row of which devices 98 is illustrated on the structural part 96 of FIG. 13. In such contexts of use, it is especially desirable to be able to test such vulnerable areas, and the structure illustrated in FIG. 13 wherein the gauge 100 is intertwined around the fastening devices 98, is particularly advantageous. Suitable leads 102 are affixed to the ends of the gauge 100 and connected to an external circuit as described above.

One of the great advantages of the invention is the versatility illustrated by the different embodiments such as shown in FIGS. 8, 10, 11, 12, and 13.

A gauge as shown in FIG. 10 has been fabricated and tested, and the results of the tests thereon are described in the following examples.

EXAMPLE II

Figure 14:
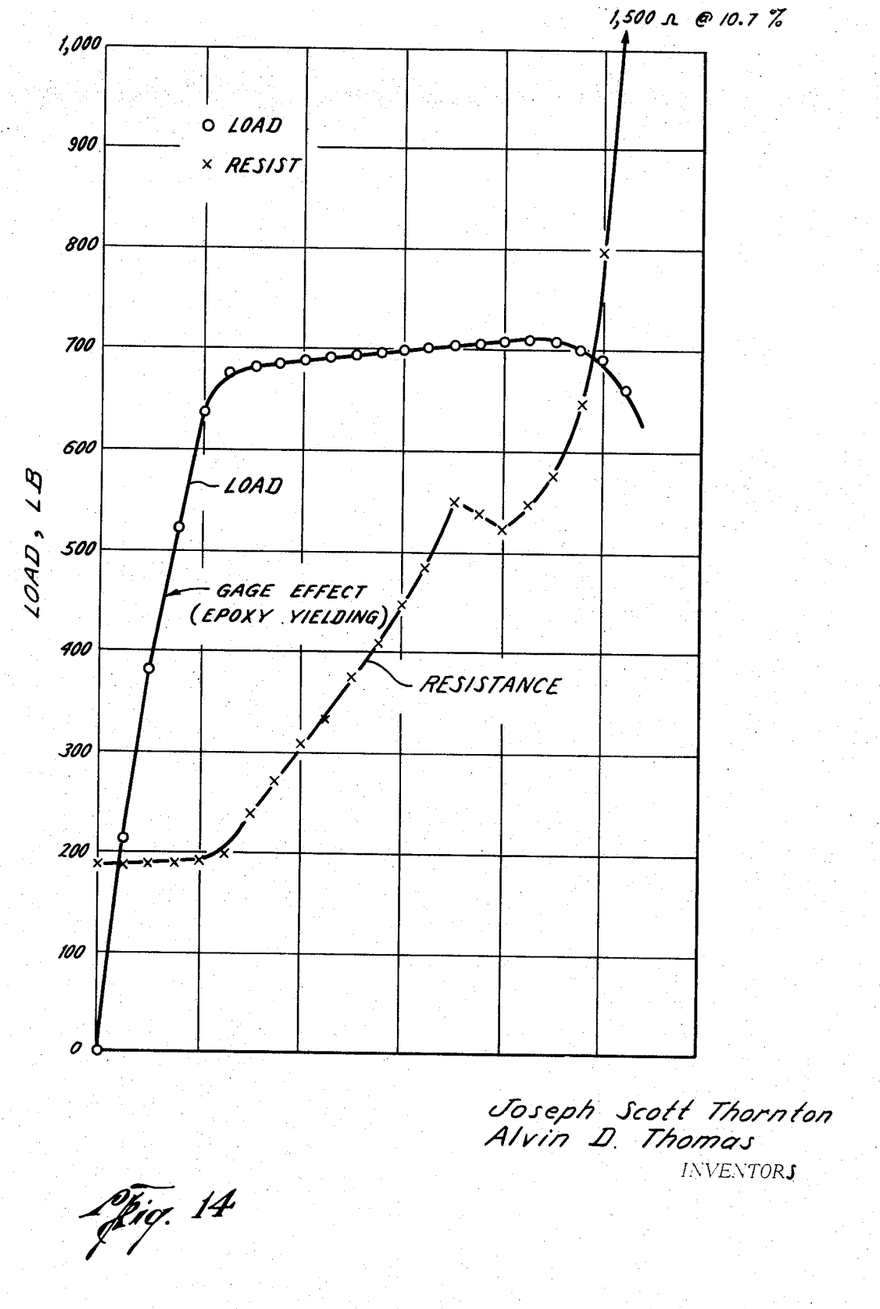
FIG. 14 is a chart illustrating test results on the sample of Example II.

A safety gauge constructed as illustrated in FIG. 10 was applied to a one-half-inch by one-sixteenth-inch strip of 6061–T6 aluminum alloy. The gauge fibers were Thornel 40 graphite and the matrix was a plastic material formed by a mixture of Genepoxy 190 (an epoxy) and Versamid 140 (a polyimide) cured at 160°F for 4 hours. The matrix resin also acted as the adhesive to bond the gauge to the aluminum surface. The tensile stress-strain characteristics of the aluminum were determined at the same time that the resistance-strain characteristics of the safety gauge were determined. The result of this test is shown in FIG. 14 and demonstrates the correlation between tensile strain and gauge resistance.

EXAMPLE III

Figure 15:
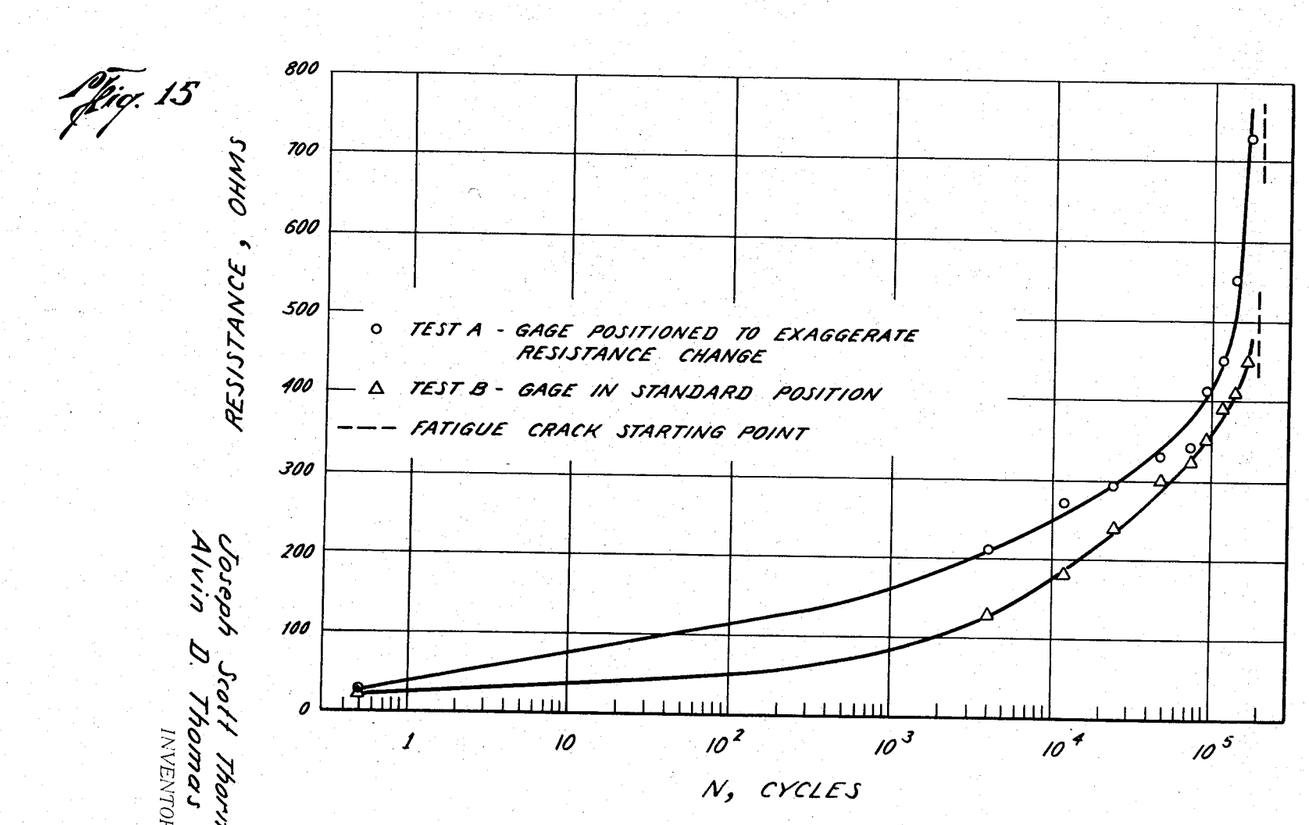
FIG. 15 is a chart illustrating test results on the samples of Examples III and IV.

A safety gauge constructed as in Example II was applied to a second strip of 6061–T6 aluminum alloy. The gauge was identical to the gauge of Example II, but the aluminum alloy strip was tapered for flexural fatigue testing using a Krause or cantilever type fatigue test. The resistance versus number of alternating stress cycles at 30,000 psi relationship for this sample is shown in FIG. 15 and designated Test A.

EXAMPLE IV

Another sample was fabricated in a similar manner to the sample of Example III, except that the fibers were placed closer to the surface of the 6061–T6 alloy. The resistance versus number of cycles curve for this sample (designated Test B) is shown in FIG. 15, and the curve is lower than that revealed for Test A. This is believed to result from the fact that in a flexural situation the strain developed in the fibers closer to the neutral axis is less than in fibers farther from the neutral axis.

The test data show that the gauge resistance increases uniformly with stress cycling and further that the sensitivity can be adjusted by placement of the fibers in the gauge. The failures of the 6061–T6 samples are indicated by the two dashed lines in FIG. 15, at approximately 200,000 cycles. With such a correlation at hand, the remaining fatigue lifetime at a stress level of 30,000 psi for 6061–T6 aluminum could be predicted from the resistance of a properly applied safety gauge. Impending fatigue failure is characterized by a rapid increase in resistance to a high level of greater than 400 ohms above the original resistance of the gauge.

As the matrix material for the gauges of this invention, any suitable resin may be employed, for example any of the suitable commercially available thermo-set polyester or epoxy resins. As one example, the epoxy ethers produced by the interaction of epichlorohydrin and polyhydroxy phenols are suitable for use in the invention, such as "Scotchply," Type 1002, a product of 3M Company. As another example, a mixture of epoxy and polyimide resins such as Genepoxy 190 and Versamid 140, products of General Mills, is useful.

The conducting fibers utilized in the invention are preferably graphite fibers such as the "Thornel" 25, 40 and 50 fibers available from Union Carbide Corporation, the "Morganite" Type I and II fibers available in the U.S.A. from Whittaker Corp., or the "HMG" type available from Hitco, Inc. These fibers are furnished as yarn or tow and all have fracture strains on the order of 0.5 – 1 percent and moduli of elasticity between 25 and $50 \times 10^6$ psi. Furthermore, these fibers have interlaminar shear strengths (a measure of bond strength) that have been demonstrated to be controllable between about 2,000 psi and 10,000 psi. Desired interlaminar shear strengths can be specified to the supplier or can be obtained by the user by suitable processes such as acid oxidation or heat cleaning.

When the conducting fibers are to be disposed in a resin-fiber composite material in accordance with some embodiments of this invention, such fibers may be so disposed in any desirable manner. For example, the conducting fibers may be prepositioned by weaving them into glass cloth which is then utilized to form the composite material as by impregnation with suitable resin. The conducting fibers might be aligned and collated into glass tape which is preimpregnated with resin for later use. Or the conducting fibers may be wound with glass fibers in a filament winding process, and might be placed by hand or machine into composite structures as between plies in laminates, at predetermined levels in chopped-glass resin mats, or inserted between passes in a filament winding process.

It is an important feature of this invention that the bundles of conducting filaments be separated by the matrix material, and that the individual conductive filaments be so separated to the extent practical. Separation need not be great, but the filaments should not if possible be touching other filaments. Yet even though such separation is important for best results in accordance with this invention, it is not absolutely necessary that there be total separation. That is, it is not critical for obtaining satisfactory results in most instances, that every conductive filament be separated by matrix material from every other conductive filament. It is only necessary that such filaments (or groups of filaments) be separated to the extent practical, and that there be a general separation of conductive fiber from conductive fiber in the material.

Separation of the conductive filaments as described above yields best results since measurement of the irreversible changes in the structural parts in accordance with the invention is possible because of the gradual breaking of individual filaments upon flexing of the structural part. If two filaments are disposed in the same location, they are likely to break at the same instant and the resultant resistivity measurements will not give quite so true an indication of the fatigue history of the part. It follows also, that the larger the number of conducting filaments which are included within a bundle of such filaments, and the greater the separation within the bundle, the more reliable will be the information taken upon making of the indicated measurements.

While the invention has been described in terms of particularly advantageous embodiments, it will be readily understood by those of skill in the art that various changes might be made in the structures illustrated and described without departing from the scope of the invention which is defined in the following claims.

For example, even though the description has been principally in terms of epoxy resin, glass fibers, and graphite fibers, it is recognized that othe materials might be suitable or even desired for certain contexts of use. As examples of other materials which might be employed, the composite might be aluminum reinforced with silicon carbide, the conductive fibers might be tungsten filaments coated with high modulus boron which would serve to insulate the tungsten from the metal matrix.

What is claimed is:

1. A safety gauge suitable for measuring irreversible mechanical damage in a structural part during or after use thereof, said gauge being incorporated in said structural part as an integral part thereof and comprising:
    a resin matrix material;
    a bundle of conducting graphite filaments disposed in said matrix material, said filaments being generally separated from adjacent filaments by matrix material;
    means to measure the resistivity across said filament bundle;
    electrical leads attached to the ends of said filament bundle and to said measuring means, whereby the resistivity across said bundle is measured to determine the fatigue of said structural part during or after use thereof, fatigue being indicated by fracture of some or all of said filaments.

2. A safety gauge suitable for measuring irreversible mechanical damage in a structural part during or after use thereof, said gauge being bonded to said structural part by a suitable adhesive agent and comprising:
    a resin matrix material;
    a bundle of conducting graphite filaments disposed in said matrix material, said filaments being generally separated from adjacent filaments by matrix material;
    means to measure the resistivity across said filament bundle; electrical leads attached to the ends of said filament bundle and to said measuring means, whereby the resistivity across said bundle is measured to determine the fatigue of said structural part during or after use thereof, fatigue being indicated by fracture of some or all of said filaments.

3. A safety gauge in accordance with claim 2, wherein said matrix material is an epoxy resin.

4. A safety gauge in accordance with claim 2, wherein said gauge additionally includes reinforcing glass fibers disposed in said matrix material.

5. A safety gauge in accordance with claim 1, wherein said matrix material is an epoxy resin.

6. A safety gauge in accordance with claim 1, wherein said gauge additionally includes reinforcing glass fibers disposed in said matrix material.

* * * * *